United States Patent
Houbart et al.

(10) Patent No.: US 10,963,946 B2
(45) Date of Patent: Mar. 30, 2021

(54) MIXED CART SOLUTION FOR AN IN-STORE APP

(71) Applicant: salesforce.com, inc., San Francisco, CA (US)

(72) Inventors: Gilberte Houbart, Cambridge, MA (US); Daryn Cox, Layton, UT (US); Aeshvarya Verma, Woburn, MA (US); Hayim Kobi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 202 days.

(21) Appl. No.: 16/051,401

(22) Filed: Jul. 31, 2018

(65) Prior Publication Data
US 2020/0043076 A1    Feb. 6, 2020

(51) Int. Cl.
G06Q 30/00    (2012.01)
G06Q 30/06    (2012.01)
G06Q 30/02    (2012.01)

(52) U.S. Cl.
CPC ..... G06Q 30/0633 (2013.01); G06Q 30/0281 (2013.01); G06Q 30/0631 (2013.01); G06Q 30/0641 (2013.01); G06Q 30/0643 (2013.01)

(58) Field of Classification Search
CPC .......... G06Q 30/0633; G06Q 30/0631; G06Q 30/0641; G06Q 30/0643
See application file for complete search history.

(56) References Cited

U.S. PATENT DOCUMENTS

| | | | | |
|---|---|---|---|---|
| 7,647,247 | B2* | 1/2010 | Abraham | G06Q 30/0605 705/26.2 |
| 8,117,089 | B2* | 2/2012 | Minsky | G06Q 30/0603 705/27.1 |
| 8,983,864 | B2* | 3/2015 | Prindle | G06Q 30/0617 705/26.8 |
| 10,296,962 | B2* | 5/2019 | Abraham | G06Q 30/06 |
| 10,402,776 | B2* | 9/2019 | Grabovski | G06Q 30/0207 |
| 10,510,103 | B2* | 12/2019 | Bleakley | H04W 4/33 |
| 10,726,471 | B2* | 7/2020 | Avgiris | H04L 67/16 |

(Continued)

OTHER PUBLICATIONS

"Welcome to a New Era of Connected Customer Experiences: Salesforce Delivers New Innovations for Digital Engagement Across Marketing, Commerce and Service," by Jenny Smelyanets, PR Newswire (New York), Jun. 13, 2018 (Year: 2018).*

(Continued)

*Primary Examiner* — Anne M Georgalas
(74) *Attorney, Agent, or Firm* — Sterne, Kessler, Goldstein & Fox P.L.L.C.

(57) ABSTRACT

Disclosed herein are system, method, and computer program product embodiments for providing a mixed-cart solution for an in-store app. An embodiment operates by receiving a request to add an item from a physical store to an associate shopping cart associated with an account. It is determined that the account is additionally associated with an online shopping cart associated with the store, and that the requested item does not exist in the online shopping cart. It selected item is added to the associate shopping cart. Both the online shopping cart and the associate shopping cart are provided to a computing device configured to simultaneously display both the online shopping cart and the associate shopping cart.

18 Claims, 8 Drawing Sheets

(56) References Cited

U.S. PATENT DOCUMENTS

| | | | | |
|---|---|---|---|---|
| 2001/0044751 A1* | 11/2001 | Pugliese, III | ...... | G06Q 30/0643 |
| | | | | 705/14.1 |
| 2007/0078727 A1* | 4/2007 | Spiegel | ................ | G06Q 30/06 |
| | | | | 705/26.8 |
| 2007/0235527 A1* | 10/2007 | Appleyard | ......... | G06Q 30/0603 |
| | | | | 235/383 |
| 2008/0040240 A1* | 2/2008 | Covington | ......... | G06Q 30/0633 |
| | | | | 705/26.8 |
| 2013/0085888 A1* | 4/2013 | Kim | .................. | G06Q 30/0601 |
| | | | | 705/26.8 |
| 2014/0351082 A1* | 11/2014 | Lowinger | .......... | G06Q 30/0633 |
| | | | | 705/26.8 |
| 2015/0026037 A1* | 1/2015 | Thompson | ........... | G06Q 40/025 |
| | | | | 705/38 |
| 2016/0283925 A1* | 9/2016 | Lavu | ................... | G06Q 20/401 |
| 2016/0335707 A1* | 11/2016 | Ranasinghe | ....... | G06Q 30/0633 |
| 2016/0371766 A1* | 12/2016 | Schmidt | ............ | G06Q 30/0633 |
| 2017/0076352 A1* | 3/2017 | Ranasinghe | ....... | G06Q 30/0635 |
| 2018/0137557 A1* | 5/2018 | Vadher | .................. | G06F 16/951 |
| 2019/0362309 A1* | 11/2019 | Ang | ................... | G06Q 10/0875 |

OTHER PUBLICATIONS

"Omnichannel: revolutionizing the customer experience," by Alan Burkitt-Gray, Global Telecoms Business Euromoney Institutional Investor PLC (Oct. 5, 2015) (Year: 2015).*

"Technology and the Customer Interface: What Consumers want in the Physical and Virtual Store," by Raymond R. Burke, Journal of the Academy of Marketing Science, Fall 2002, 30, 4 (Year: 2002).*

"NetSuite Launches SuiteCommerce InStore, Dramatically Improving the In-Store Experience for Consumers and Employees; New Point of Sale Solution Unifies In-Store and Online Brand Experiences, Enabling Omnichannel Commerce from a Single Cloud Commerce Platform," M2 Presswire (Coventry), May 6, 2015 (Year: 2015).*

"GameStop Takes Retail Innovation to the Next Level," News Bites-Consumer Durables & Apparel (Melbourne), Jan. 13, 2015 (Year: 2015).*

* cited by examiner

MIXED CART SOLUTION FOR AN IN-STORE APP

BACKGROUND

Many traditional brick-and-mortar stores now have apps and websites through which customers can order their products. Many customers use both the apps to order products, and also come into the store to purchase certain products, particularly those that they want immediately. However, when these customers come into the store, the sales associate helping the customer does not have access to the online data which could prevent the sales associate from being able to provide a premium customer-service experience.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a mixed-cart solution for an in-store app.

Figure 1:
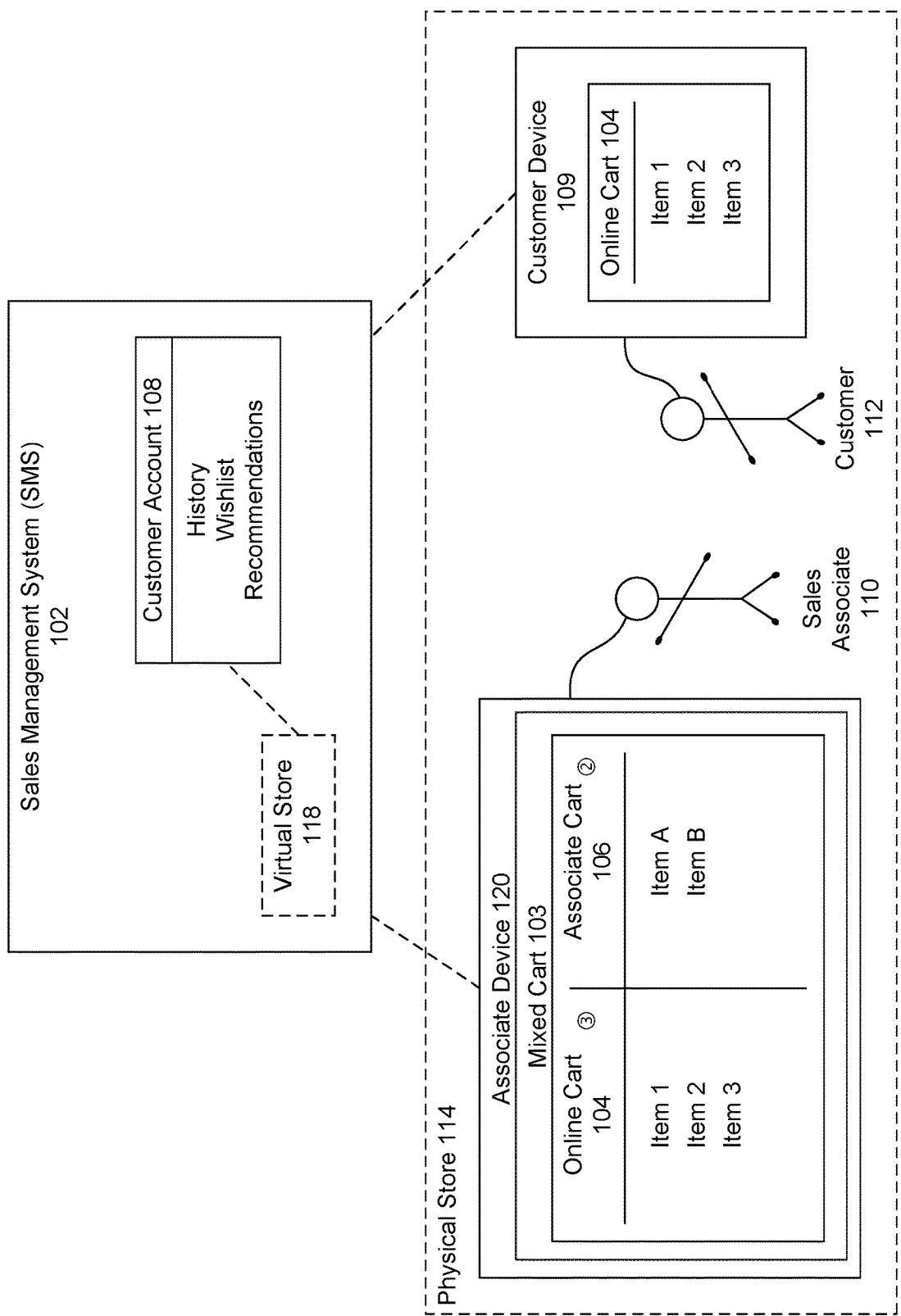
FIG. 1 is a block diagram illustrating example functionality for providing a mixed-cart solution for an in-store app, according to some embodiments.

FIG. 1 is a block diagram 100 illustrating example functionality for providing a mixed-cart solution for an in-store app, according to some embodiments. In the example of FIG. 1, a sales management system (SMS) 102 may coordinate the selection and purchase of items using a mixed cart 103.

Mixed cart 103 may be application or interface that enables a user to view and coordinate the purchase of items from a variety of shopping carts that may be associated with the same customer account or business. In an embodiment, mixed cart 103 may receive requests to add, update, and purchase items selected from both a virtual store 118 and physical store 114 of a particular business, entity, retailer, or organization.

SMS 102 may coordinate and manage the item and product selections between an online cart 104 and an associate cart 106. SMS 102 may further make available customer account information 108 (associated with a customer's online profile, including the navigation or purchase of items from virtual store 118) available to a sales associate 110 who may be assisting customer 112 in a physical location or store 114 of the business. In an embodiment, the associate cart 106 may be a store cart associated with the physical store 114, accessible to multiple sales associates 110. Having access to this customer account information 108, may enable sales associate 110 to provide customer 112 with a premium in-store customer service and shopping experience.

In an embodiment, customer 112 may use a customer device 109, such as a mobile phone or laptop, to interact with a virtual store 118. Virtual store 118 may include an app, website, or other network-accessible inventory system. Virtual store 118 may provide inventory (items) for customer 112 to browse, comment on, mark, share, like, and purchase. In an embodiment, virtual store 118 may track which item(s) a customer browses, which item(s) are added to a wish list (e.g., a list of items which the customer has marked of to be of interest in customer account 108), which item(s) are added to an online cart 104 associated with the virtual store 118, which items a customer writes or reads reviews about, and which items are purchased/returned. This information may be stored in a customer account 108 database or file.

In the example shown, the customer 112 may have added several items 1, 2, 3 in their online cart 104. When customer 112 walks into physical store 114, customer 112 may be greeted by sales associate 110. Physical store 114 may include a booth, stall, a pop-up store, or a traditional physical brick-and-mortar sales location where customers may purchase items (some of which may also be available through the virtual store 118). In an embodiment, physical store 114 may include one or more sales associates 110 or other personnel who are available to help customers 112 find and purchase merchandise from physical store 114.

In assisting customer 112, sales associate 110 may inquire whether customer 112 has an online account 108 with virtual store 118. If the customer 112 says 'yes', then with customer 112 authorization or permission, sales associate 110 may login to customer account 108.

Sales associate 110 may ask customer 112 for identifying information such as a phone number, e-mail address, name, physical address, identification card, account number, password, or other information associated with the customer account 108. In an embodiment, a customer device 109 may connect to a Wi-Fi or other network associated with the physical store 114, and upon detecting customer device 109, SMS 102 may provide associate device 120 (which may be associated with physical store or one or more sales associates 110) access to customer account 108.

In an embodiment, upon receiving a request by sales associate 110 to login to customer account 108, SMS 102 may request customer 112 to authorize sales associate 110 to access customer account 108. For example, a notification may pop up on customer device 109 notifying customer that sales associate 110 has accessed customer account 108 (which may include online cart 104). In another embodiment, a notification may request authorization from customer 112 (on either customer device 109 or associate device 120) prior to granting sales associate 110 with access. In an embodiment, customer 112 may be requested to enter a PIN or login associated with customer account 108 to grant access.

Upon verification or login of sales associate 110 into customer account 108, SMS 102 may provide, via associate device 120, access to mixed cart 103 and customer account information 108.

In an embodiment, sales associate 110 may login to customer account 108 after already having added items to an associate cart 106. SMS 102 may then enable sales associate 110 to link an existing associate cart 106 with an existing online cart 104 or customer account 108. As part of this linking process, SMS 102 may compare or coordinate the items in online cart 104 and associate cart 106 and notify sales associate 110 of any overlaps or other recommended items for customer 112. In an embodiment, upon sales associate login or linking of carts 105, 106, associate device 120 and/or customer device 109 may be updated to display mixed cart 103.

Sales associate 110 may assist customer 112 in selecting products from physical store 114. In an embodiment, mixed cart 103 may enable sales associate 110 to view and update both online cart 104 (with whatever items may have been previously selected by customer 112 through virtual store 118) and associate cart 106 (which may include items added by sales associate 110 through associate device 120—items which may be available either through physical store 114 and/or virtual store 118).

In an embodiment, mixed cart 103 may enable sales associate 110 to add and remove items and swap items between online cart 104 and associate cart 106. SMS 102 may manage the interaction between the various carts 104, 106 of mixed cart 103. In another embodiment, sales associate 110 may have read-only access to online cart 104 and may be prevented from modifying online cart 104 without customer 112 authorization.

As shown in the example of FIG. 1, associate device 120 may provide simultaneous access to both a customer's online cart 104 and the associate's in-store cart 106 from one interface or device. For example, mixed cart 103 may enable sales associate 110 to see both items 1, 2, 3 and items A, B as selected in their respective carts simultaneously. Mixed cart 103 may also enable sales associate 110 and/or customer 112 to select either cart, toggle between them, and manage which items remain in that cart, are removed, or are swapped to the other cart.

Associate device 120 may include a mobile phone, laptop computer, tablet computer, or other computing device that enables the display of mixed cart 103. In an embodiment, the display on associate device 120 may include any customer account 108 information, including but not limited to mixed cart 103. For example, sales associate 110 (if authorized) may view customer account information 108 while logged into customer account 108 on associate device 120.

Customer account information 108 may include a history of the customer purchases and/or browsing sessions, wish list items the customer 112 wants to or is considering purchasing, and SMS 102 generated recommendations based on the history, wish list, sales, or other online information. With access to online cart 104 and other customer account information 108, sales associate 110 may be better able to provide customer 112 with a greater customer service experience, such as product or service recommendations, while in physical store 114.

In an embodiment, SMS 102 may send a notification to associate device 102 when one or more items from online cart 104 (or browsing history or wish list from customer account 108) are available in the physical store 114. For example, customer 112 may have added a particular blue sweater, in size Medium into their online cart 104 from virtual store 118 (e.g., such as a store website). However, customer 112 may not have purchased the sweater (and so the item remains in online cart 104).

When sales associate 110 logs into SMS 102 and accesses customer account 108, SMS 102 may notify sales associate 110 that the blue sweater in size Medium is available and in-stock in physical store 114 (or at a location nearby). Sales associate 110 may provide the customer 112 with this information and allow the customer 112 to try on or purchase the sweater in-store. Or, for example, SMS 102 may notify sales associate 110 through associate device 120 that a previously-browsed item is on sale in the store 114.

If customer 112 wants to purchase the sweater today, sales associate 110 may scan or enter an item code associated with the sweater into associate device 120. In an embodiment, associate device 120 may include a barcode scanner. Upon receiving the item or barcode number of the sweater or other items from sales associate 110, SMS 102 may compare the received items (in associate cart 106) against existing items online cart 104 (and/or wish list) to determine whether or not duplicate items exist in both carts.

In an embodiment, SMS 102 may determine that the blue sweater already exists in the online cart 104. Then, for example, SMS 102 may notify the sales associate 110 of the overlap, who may then communicate with customer 112. SMS 102 may automatically, or may otherwise enable sales associate 110 to move the sweater from online cart 104 to associate cart 106. In an embodiment, SMS 102 may request customer 112 confirmation on customer device 109 or associate device 120 before updating online cart 104.

In an embodiment, SMS 102 may also indicate whether similar (and not necessarily identical) items exist in both carts. For example, SMS 102 may detect whether a different blue sweater or the same blue sweater in a different size exists in online cart 104 when a similar sweater is received into associated cart 106. Or, for example, SMS 102 may detect that the same sweater in a different color and/or size exists in online cart 104 or is available in-store.

Associate cart 106 may include those items that customer 112 wants to purchase in the physical store 114. In an embodiment, some of the items of associate cart 106 may be in-stock and available for customer 112 to take from the physical store 114 today (at the time the sales transaction completes), while other items may be shipped to customer 112 at a later date or time.

While purchasing items to be shipped, SMS 102 may synchronize the customer account information 108 between via mixed cart 103. This may save time and bandwidth by preventing the sales associate 110 from asking the customer for their shipping address, and then transmitting this information to SMS 102. Instead, SMS 102 may automatically apply or import the customer's preferred shipping method and address. However, at the time of the sales transaction, customer 112 or sales associate 110 may update or change these preferences. For example, customer 112 may request shipping to a different address or by a different shipping method than may have been previously selected or used.

Furthermore, by enabling a dual interface of mixed cart 103, and enabling a swap of items and other interactions between different carts 104, 106, SMS 102 saves processing resources versus requiring associate device to log into two different accounts using two different windows or applications and interacting with each one separately.

In an embodiment, SMS 102 may enable customer 112 to purchase everything from both carts (online cart 104 and associate cart 106) as part of a single transaction using previously stored payment information. For example, sales associate 110 may complete an in-store transaction using previously stored credit card or payment information from customer account 108. This may also save both time and bandwidth as this information would already be pre-verified and does not need to be transmit from associate device 120 to SMS 102 for verification.

Alternatively, customer 112 may purchase items from mixed cart 103 using a different credit card or by paying cash in the physical store 114. In an embodiment, items from online cart 104 that are purchased in-store 114 may be automatically moved to associate cart 106 and thus made available for in-store purchase even if they are to be delivered at a later date or time from a different location other than physical store 114. In an embodiment, SMS 102 may prompt associate device 102 that items purchased in store 114 may be shipped for customer 112 (and provide an estimated cost, or may be for free).

Figure 2:
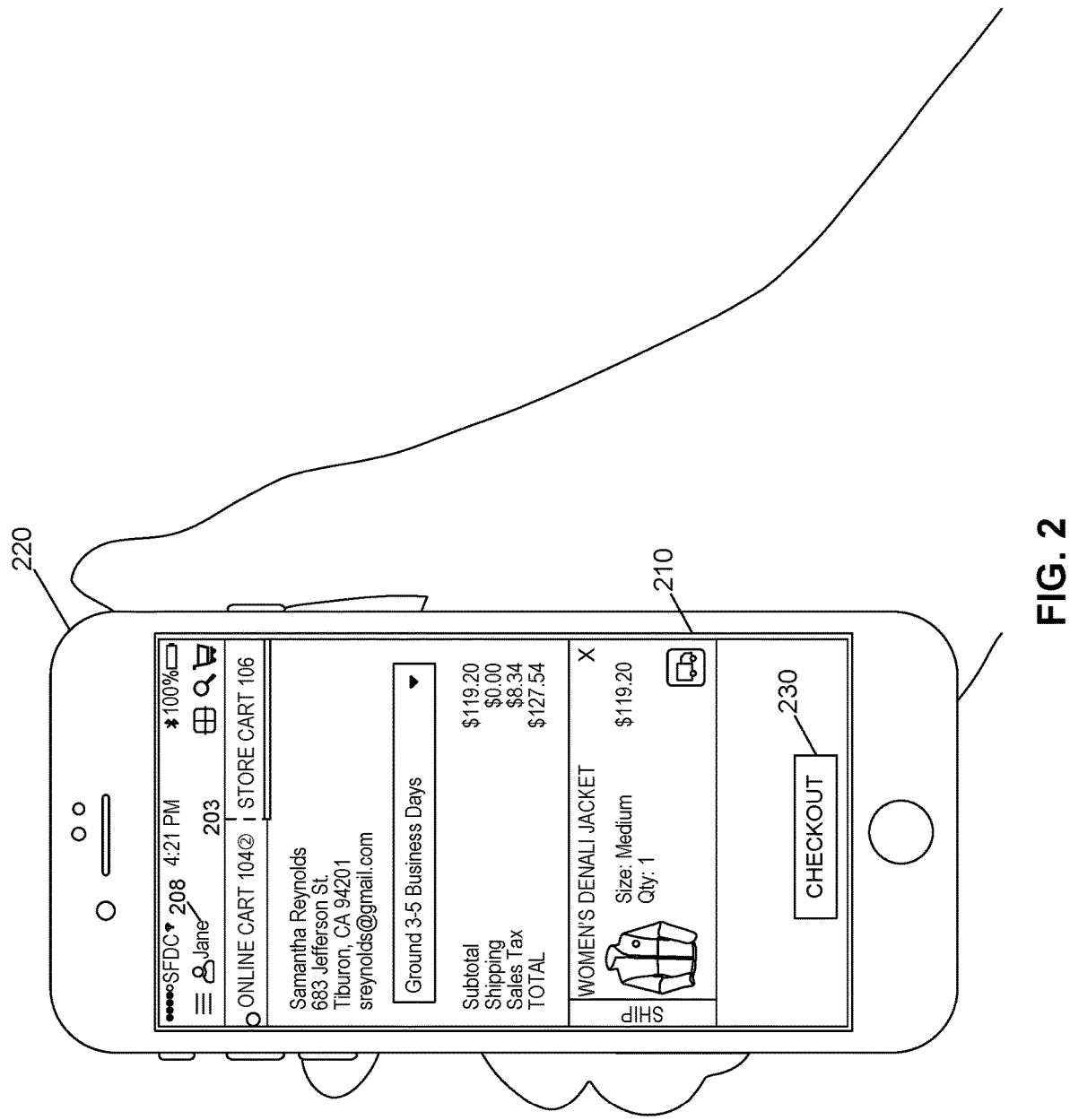
FIG. 2 illustrates an example of a mixed cart interface, according to an example embodiment.

FIG. 2 illustrates an example of a mixed cart interface 203, according to an example embodiment. Once logged in, sales associate 110 may have access to customer account information 108 via associate device 220. Mixed cart interface 203 may display the customer name, which may also be an icon 208. In an embodiment, sales associate 110 may select icon 208 to access customer account information 108 which may not be displayed on the interface 203. For example, icon 208 may enable sales associate 110 to view a purchase history of previously purchased items by customer 112, including either previous online purchases or in-store purchases.

Associate device 220 may enable sales associate 110 to see and toggle between the online cart 104 and store or associate cart 106. In the example shown, store cart 106 may include a jacket that is set to be shipped as indicated by the shipping icon 210. SMS 102 may have automatically populated the shipping address and other customer preferences from the customer's account information 108, which may include a default address, or a previous address used to ship previously ordered items either in store or online.

Mixed cart interface 203 may include items from both associate cart 106 and/or online cart 104. As shown in the example, the online cart indicates that two items have been placed in the online cart but have not yet been purchased. In an embodiment, the interface 203 may also indicate whether any items exist on a customer's wish list. By selecting the online cart label or icon 104, the sales associate may see which items are stored in online cart 104 and may move those items to the associate cart 106 for immediate purchase. SMS 102 may coordinate which items exist in which cart 104, 106. By selecting button 230, SMS 102 may enable the customer or sales associate to complete the purchase using a checkout interface.

Figure 3:
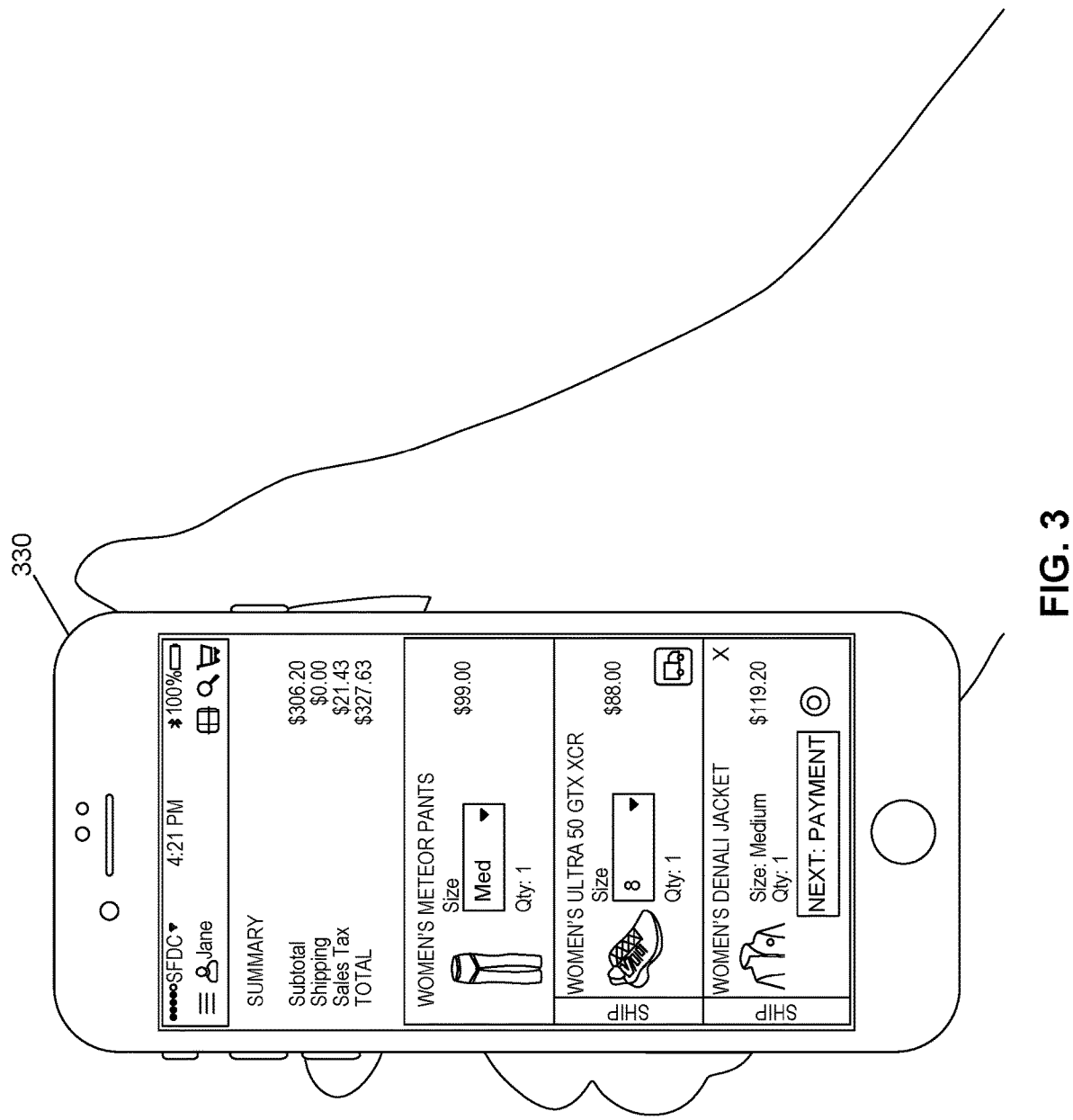
FIG. 3 illustrates an example checkout user interface on a sales associate device, according to an example embodiment.

FIG. 3 illustrates an example checkout user interface 330 on a sales associate device, according to an example embodiment. SMS 102, via checkout interface 330, may enable the sales associate to change the items in the carts, move items to be picked up to be shipped, move shipped items to in-store pick up, and change the prices of items.

In an embodiment, during the purchase transaction, SMS 102 may enable a sales associate 110 to specify whether the customer 112 wants to purchase the items from the online cart 104 and if so move them to associate cart 106. In an embodiment, any items not selected or specified for purchase may be moved to the online cart 104, a wish list, or to a list of previously viewed items in the history section of customer account information 108 associate cart 106

Figure 4A:
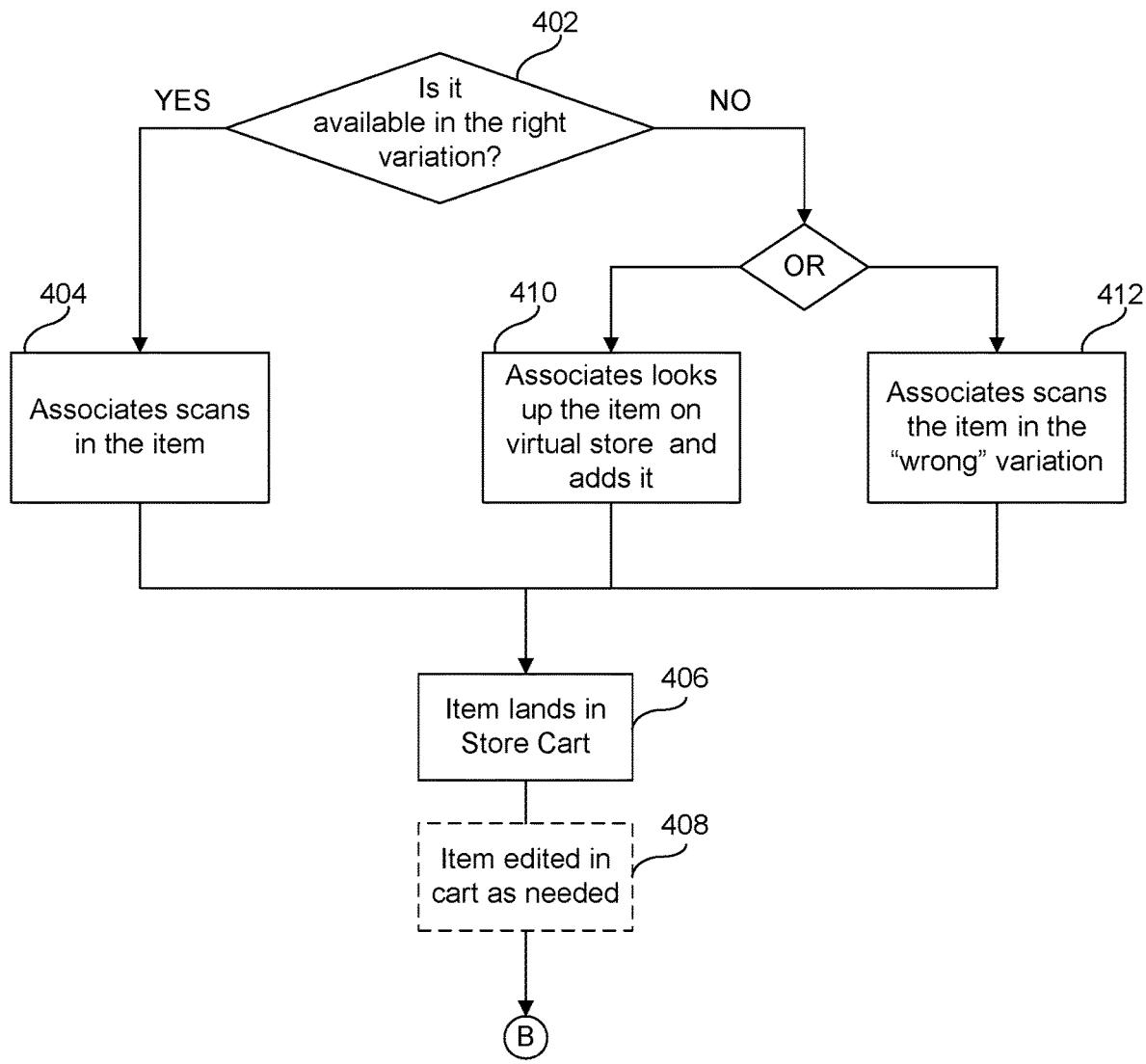
FIGS. 4A-4C illustrate an example flowchart illustrating example operations of a sales management system (SMS) providing a mixed-cart solution for an in-store app, according to some embodiments.
Figure 4B:
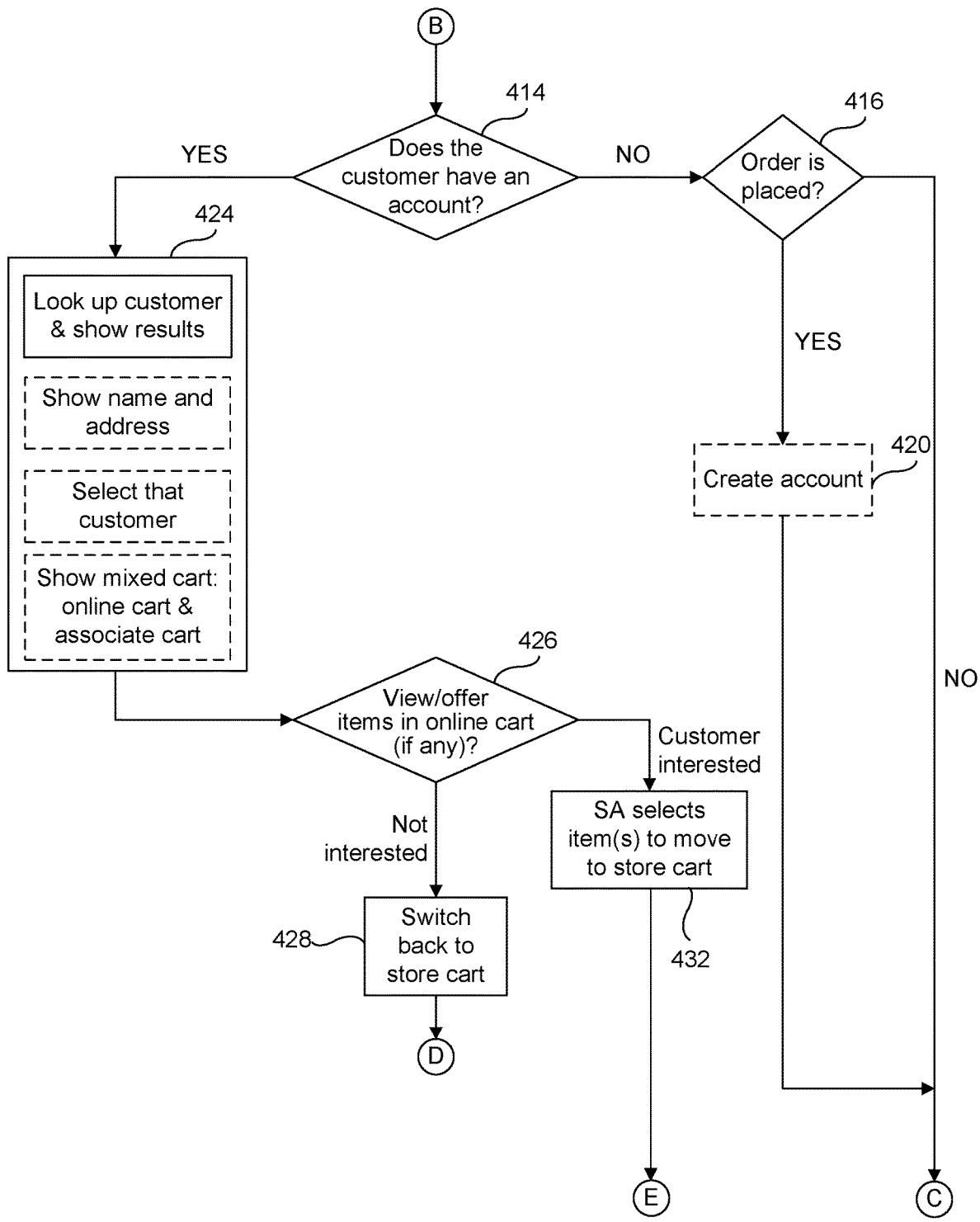
Figure 4C:
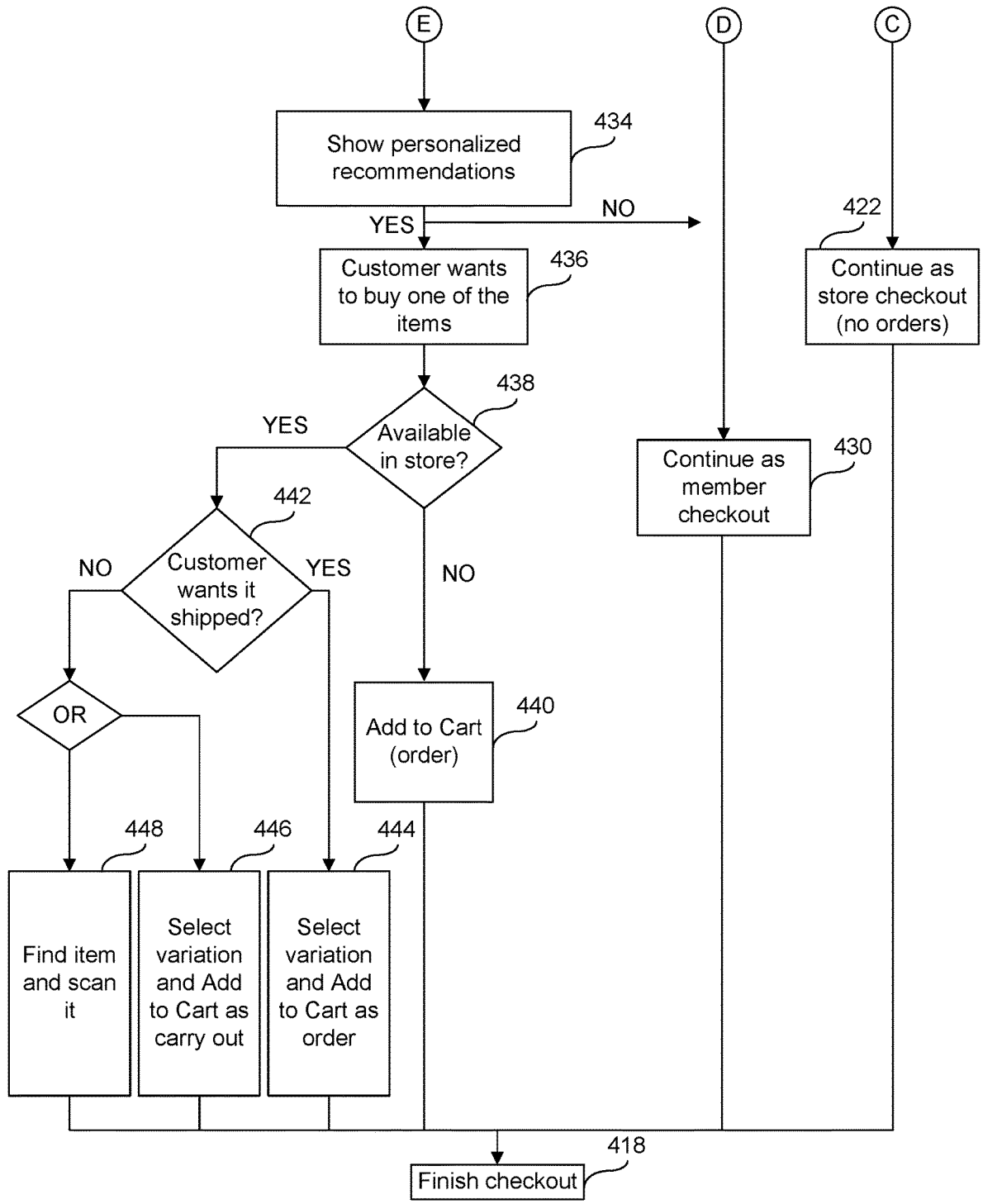

FIGS. 4A-4C illustrate an example flowchart 400 illustrating example operations of a sales management system (SMS) 102 providing a mixed-cart solution for an in-store app, according to some embodiments. As shown in FIG. 1, a customer 112 may walk into a store and is interested in an item carried by the store 114. Customer 112 may ask a sales associate 110 for assistance. Customer 112 tells sales associate 110 about their preferences or specifications for the item they are interested in purchasing.

In 402, sales associate 110 may determine whether the item is available in the right variation or configuration according to what the customer 112 has communicated. In 404, if the item customer 112 wants is available in the store 114, sales associate 110 may scan its barcode or otherwise enter the item into SMS 102 suing associate device 120. In 406, SMS 102 may then display the item in the store or associate cart 106. This may be performed with or without logging into or synchronizing with customer account 108.

If an item is not available in-store that meets the customer's requirements or preferences (e.g., color or size), then in 410, sales associate 110 may check the virtual store 118 or other inventory system using associate device 120. In 406, if the item is located in virtual store 118, sales associate 110 may select it and add it to the associate cart 106 (even though it is not available in the store 114).

In 412, if a similar model to the item customer 112 wants is available in-store 114, sales associate 110 may scan that item into associate cart 106. For example, if customer 112 wants a green sweater in size medium, but the only item that the sales associate 110 can find on the sales floor is a red sweater in size medium, sales associate 110 may scan the red sweater into associate device 120, even though the scanned item does not meet all of the customer's requirements, i.e., is a 'wrong' variation.

In 408, the sales associate may modify the item as necessary. For example, scanning the wrong item (412) and modifying the preferences in mixed cart interface 103 may enable SMS 102 to locate where and whether an item meeting all of the customer's preferences is available anywhere (online or in another store's inventory).

For example, sales associate 110 may modify the color of the sweater from red to blue. Then, for example, receiving this modification, SMS 102 may look up the blue sweater and notify whether the sweater is available in the virtual store 118, in another inventory system, in another physical store 114, or is not available. Based on whether the item could be located, customer 112 may opt to have the item shipped or the item removed from associate cart 106 (if unavailable). In an embodiment, in 408, sales associate 110 may also modify the price to reflect a sale or other discount being offered to customer 112.

In 414 (FIG. 4B), sales associate 110 may confirm with the customer 112 whether the customer already has a customer account 108. If customer 112 does not have an online account (with virtual store 118), then there is no additional information that can be provided to sales associate 110 and sales associate 100 may proceed with completing the transaction. In 416, the associate may confirm whether the customer wants to place the order. If the customer says no, then the transaction may complete without an order (see 418, FIG. 4C).

If the customer does not have an account and wants to place the order, the sales associate may optionally create a customer account with or on behalf of the customer (420). The sales associate may then check the customer out in 422 without any previous online orders. In an embodiment, upon account creation or checkout, SMS 102 may recommend to the sales associate 110 other items that may be of interest based on the item(s) being purchased in store 114.

In 414, if customer 112 indicates that they have previously created a customer account 108, then in 424 the customer account information 108 may be retrieved or looked up. In an embodiment, this may include looking up the customer by their e-mail address, name, phone number, account number, or other identifying information. In an embodiment, customer 112 may send a text message or other message from client device that provides account information and/or authorizes associate device 120 to access customer account 108. SMS 102 may then display on associate device information that summarizes customer account. The customer may verify that that is the right information, a password may be required from customer 112, and then the mixed cart interface 103 may be displayed on associate device 120.

In 426, sales associate 110 may confirm whether customer 112 is interested in hearing about any specials, sales, recommendations, or may be interested in purchasing any items that may exist in their online cart 104 right now, that may be available in-store or that may be shipped. If customer 112 is not interested, then in 428 mixed cart 103 may switch back to the associate cart 106, and sales associate 110 may check the customer 112 out as described above with respect to FIG. 3, and the checkout transaction may complete (418, FIG. 4C).

If customer 112 is interested in purchasing items from their online cart 104, then sales associate 112 may move one or more of those items into the associate cart 106 (432). In 434, SMS 102 may make in-store recommendations on the associate device 120 for the customer 112. In an embodiment, SMS 102 may enable customer 112 to view the in-store recommendations on their mobile device 109 as well.

If customer 112 indicates they are not interested in any more items, then sales associate 112 may check the customer out as a member in 430, and the transaction may complete 418. Member checkout 430 may include automatically importing payment and shipping information or preferences from customer account 108.

If customer 112 is interested in adding another item to their associate cart 106 in 436, then sales associate 110 may determine the availability of the item 438. In 440, if the item is not available in store, then sales associate 110 may add the item as an order to be delivered to the customer 112. The customer's shipping address can be imported and used to simplify and expedite the checkout process in 418. In 442, if the item is available in-store, then customer 112 may decide whether they want the item shipped or want to take it home at the time of purchase.

In 444, customer 112 may choose to have the item shipped as an order. In 446, sales associate 110 may add the item to the associate cart 106 and list it as a carry out or in-store pick up. Then another associate may locate and bring the item to the customer 112. In 448, sales associate 110 may locate the physical item and scan it into the system for purchase in-store.

Figure 5:
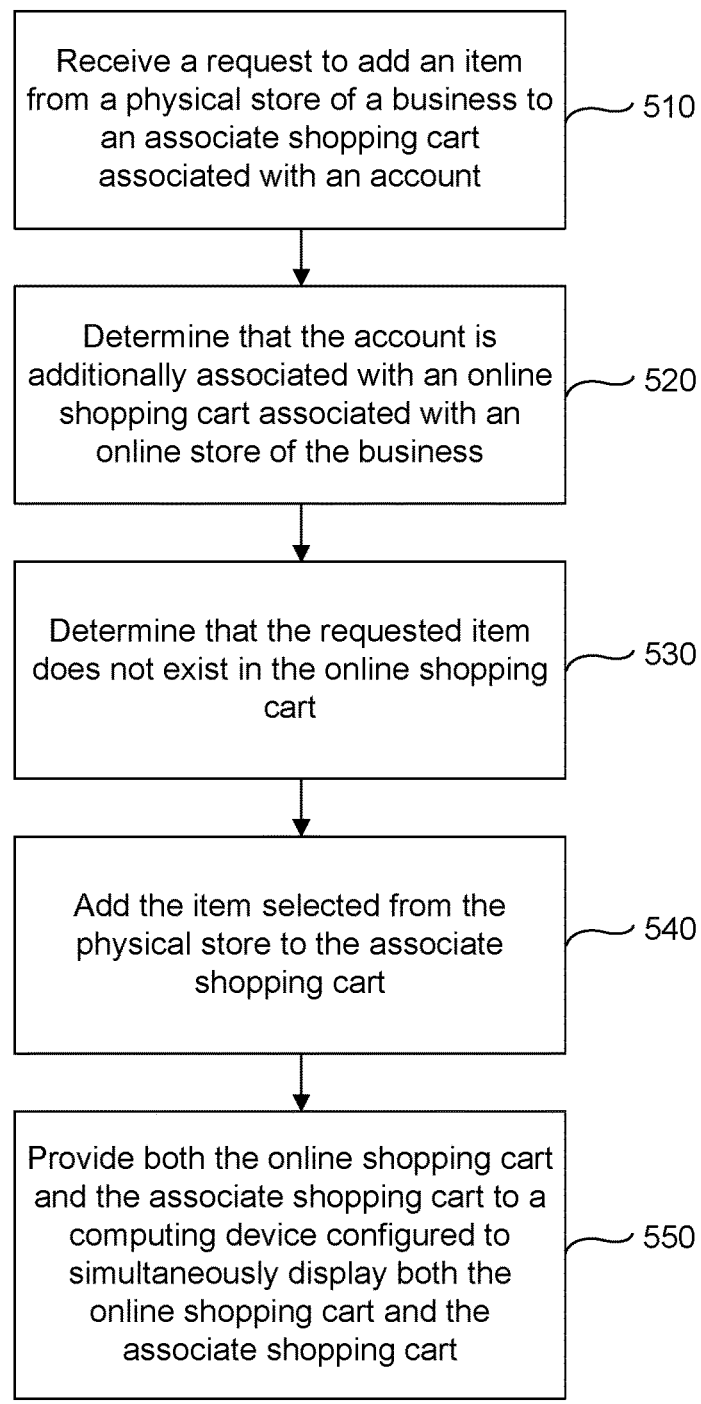
FIG. 5 is a flowchart illustrating example operations of a sales management system (SMS), according to some embodiments.

FIG. 5 is a flowchart 500 illustrating example operations of a sales management system (SMS) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1. However, method 500 is not limited to the example embodiments.

In 510, a request to add an item from a physical store of a business to an associate shopping cart associated with an account is received. For example, mixed cart interface 103 may receive a request to add an item from sales associate 110.

In 520, it is determined that the account is additionally associated with an online shopping cart associated with an online store of the business. For example, associate device 120 may be logged into a pre-existing customer account 108 which may include an online cart 104 (which may be empty, or may include items previously selected by customer 112 from virtual store 118).

In 530, it is determined that the requested item does not exist in the online shopping cart. For example, SMS 102 may verify that the item added to associate cart 106 is not a duplicate of an existing item in online cart 104. If the item is a duplication, SMS 102 may flag or warm sales associate 110 and/or user 112, and request instructions on whether the item should be moved to associate cart 106 (from online cart 104). In an embodiment, SMS 102 may annotate an order history when an item is duplicated or removed from mixed cart 103. For example, the order history may indicate that "this item was removed from online cart 104 and purchased in store on Mar. 12, 2018."

In an embodiment, when a duplicate item is detected and the product is available in store 114, SMS 102 may remove the online order of the duplicate item. If customer 112 prefers to have the item shipped, then sales associate 110 may have the item shipped either from physical store 114 or may restore the online order.

In 540, the item selected from the physical store is added to the associate shopping cart. For example, SMS 102 may display the scanned or input item in mixed cart 103.

In 550, both the online shopping cart and the associate shopping cart are provided to a computing device configured to simultaneously display both the online shopping cart and the associate shopping cart. For example, associate device 120 may include an interface that provides access and visibility to both items 1, 2, and 3 of online cart 104 and items A and B of associate cart 106. Mixed cart interface 103 may further enable coordination or changing of items from one cart to the other.

Figure 6:
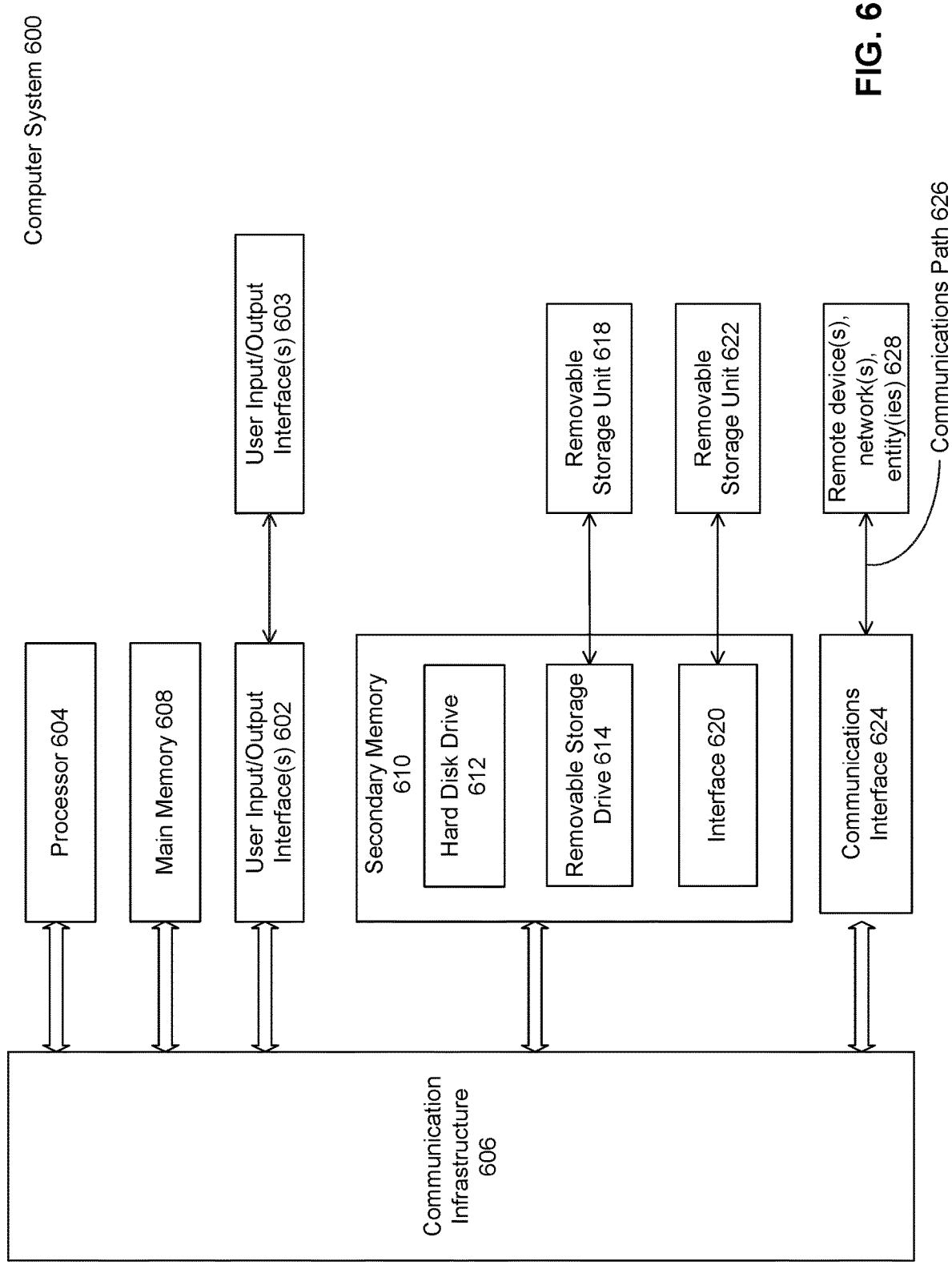
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618.

Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624.

Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a request to login to an account of a customer from an associate device corresponding to a sales associate account, wherein the account comprises both an associate shopping cart and an online shopping cart;
receiving, from a user device associated with the account of the customer and responsive to the request to login, an authorization allowing the sales associate account to access the account of the customer;
receiving, from the associate device, a request to add a first item to the associate shopping cart, wherein the first item is selected from a physical store by a sales associate operating the associate device, wherein the first item is selectable and moveable to the online shopping cart;
determining that the first item does not exist in the online shopping cart;
adding the first item selected from the physical store to the associate shopping cart; and
simultaneously displaying both the online shopping cart and the associate shopping cart on one of the user device or the associate device, wherein the associate shopping cart includes at least the first item, and the online shopping cart includes at least a second item, wherein the first item and the second item are different items.

2. The method of claim 1, wherein the request to login is received from the sales associate of the physical store.

3. The method of claim 2, further comprising:
providing, to the associate device, one or more product recommendations based on at least one of the online shopping cart, a browsing history, a wish list, or other information associated with the account of the customer.

4. The method of claim 1, further comprising:
comparing a third item selected from the physical store to one or more items in the online shopping cart;
determining, based on the comparing, that the third item does exist in the online shopping cart; and
providing a notification that the third item already exists in the online shopping cart.

5. The method of claim 4, further comprising:
removing the third item from the online shopping cart; and
placing the third item in the associate shopping cart.

6. The method of claim 1, further comprising:
receiving a request to purchase one or more items from the associate shopping cart;
determining payment information associated with the online shopping cart; and
completing a purchase transaction of the one or more items requested for purchase using the determined payment information.

7. The method of claim 6, wherein the purchase transaction is for the one or more items selected from the physical store that were added to the associate shopping cart.

8. A system comprising:
a memory; and
at least one processor coupled to the memory and configured to:
receive a request to login to an account of a customer from an associate device corresponding to a sales associate account, wherein the account comprises both an associate shopping cart and an online shopping cart;
receive, from a user device associated with the account of the customer and responsive to the request to login, an authorization allowing the sales associate account to access the account of the customer;
receive, from the associate device, a request to add a first item to the associate shopping cart, wherein the first item is selected from a physical store by a sales associate operating the associate device, wherein the first item is selectable and moveable to the online shopping cart;
determine that the online shopping cart includes a second item selected from an online store;
determine that the first item does not exist in the online shopping cart;
add the first item selected from the physical store to the associate shopping cart; and
simultaneously display both the online shopping cart and the associate shopping cart on one of the user device or the associate device, wherein the associate shopping cart includes at least the first item, and the online shopping cart includes at least the second item, wherein the first item and the second item are different items.

9. The system of claim 8, wherein the request to add the first item is received from the sales associate logged into the account of the customer.

10. The system of claim 9, wherein the processor is further configured to:
determine that the sales associate logged into the associate shopping cart is associated with the customer; and
provide, to the associate device, one or more product recommendations based on at least one of the online shopping cart, a browsing history, a wish list, or other information associated with the account of the customer.

11. The system of claim 8, wherein the processor is further configured to:
compare a third item selected from the physical store to one or more items in the online shopping cart;
determine, based on the comparing, that the third item does exist in the online shopping cart; and
provide a notification that the third item already exists in the online shopping cart.

12. The system of claim 11, wherein the processor is further configured to:
remove the third item from the online shopping cart; and
place the third item in the associate shopping cart.

13. The system of claim 8, wherein the processor that determines is further configured to:
receive a request to purchase one or more items from the associate shopping cart;

determine payment information associated with the online shopping cart; and complete a purchase transaction of the one or more items requested for purchase using the determined payment information.

14. A non-transitory computer-readable device having instructions stored thereon that, when executed by at least one computing device, cause the at least one computing device to perform operations comprising:

receiving a request to login to an account of a customer from an associate device corresponding to a sales associate account, wherein the account comprises both an associate shopping cart and an online shopping cart;

receiving, from a user device associated with the account of the customer and responsive to the request to login, an authorization allowing the sales associate account to access the account of the customer;

receiving, from the associate device, a request to add a first item to the associate shopping cart, wherein the first item is selected from a physical store by a sales associate operating the associate device, wherein the first item is selectable and moveable to the online shopping cart;

determining that the first item does not exist in the online shopping cart; adding the first item selected from the physical store to the associate shopping cart; and simultaneously displaying both the online shopping cart and the associate shopping cart on one of the user device or the associate device, wherein the associate shopping cart includes at least the first item, and the online shopping cart includes at least a second item, wherein the first item and the second item are different items.

15. The non-transitory computer-readable device of claim 14, wherein the request to login is received from the sales associate of the physical store.

16. The non-transitory computer-readable device of claim 15, further configured to perform operations comprising:

providing, to the associate device, one or more product recommendations based on at least one of the online shopping cart, a browsing history, a wish list, or other information associated with the account of the customer.

17. The non-transitory computer-readable device of claim 14, further configured to perform operations comprising:

comparing a third item selected from the physical store to one or more items in the online shopping cart;

determining, based on the comparing, that the third item does exist in the online shopping cart; and providing a notification that the third item already exists in the online shopping cart.

18. The non-transitory computer-readable device of claim 17, further configured to perform operations comprising:

removing the third item from the online shopping cart; and placing the third item in the associate shopping cart.

* * * * *